(No Model.)
A. N. RANKIN.
APPARATUS FOR CONSTRUCTING COLD PACKED PIPE JOINTS.
No. 419,995. Patented Jan. 21, 1890.
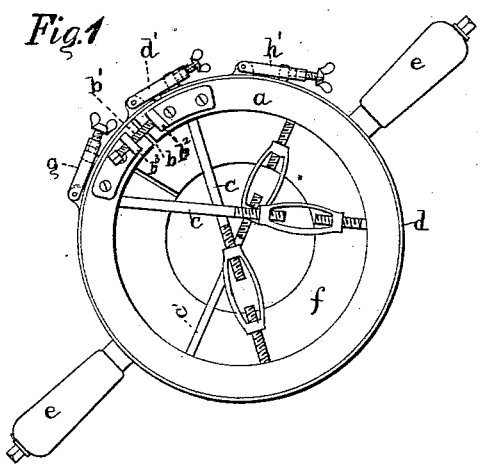
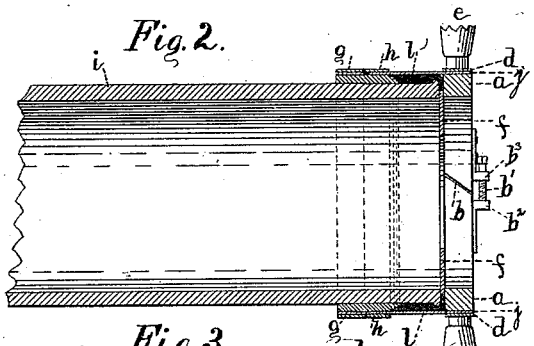
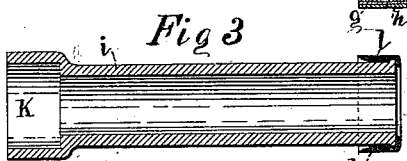
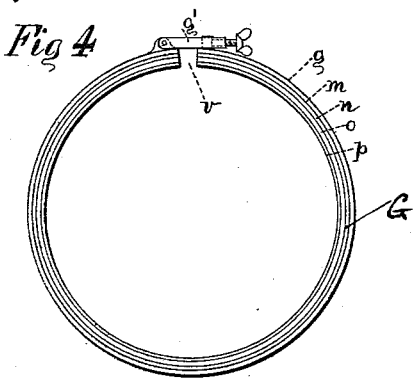
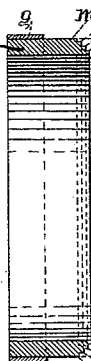
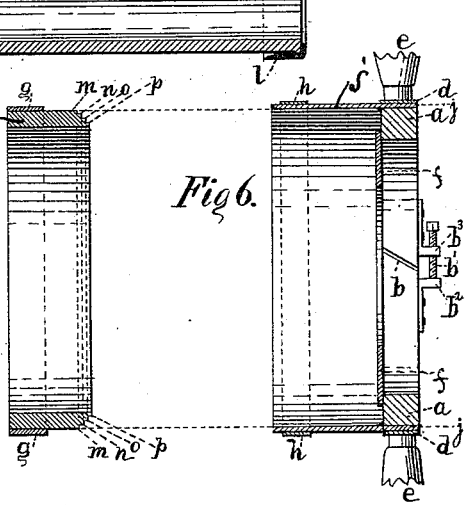
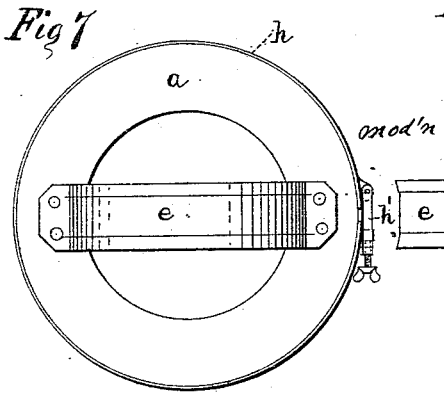
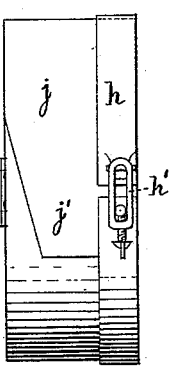
WITNESSES:
Jno. E. Simpson
Clarence F. Pillet
INVENTOR
Andrew Nevin Rankin
BY
Chas. R. Clarke
ATTORNEY

UNITED STATES PATENT OFFICE.

ANDREW NERVA RANKIN, OF JAMAICA, NEW YORK.

APPARATUS FOR CONSTRUCTING COLD-PACKED PIPE-JOINTS.

SPECIFICATION forming part of Letters Patent No. 419,995, dated January 21, 1890.

Application filed December 20, 1888. Serial No. 294,242. (No model.)

*To all whom it may concern:*

Be it known that I, ANDREW NERVA RANKIN, a citizen of the United States of America, residing in the town of Jamaica, Queens county, in the State of New York, am the inventor of new and useful Improvements in Apparatus for Constructing Pipe-Joints, of which the following is a specification, reference being had to the accompanying drawings.

My invention relates to pipe-joints and the apparatus or device for constructing the same, so as to perfect the connection between two sections of metal pipe, and thereby prevent leakage of the contents of lines of pipes, and that in a more economical manner than is done in ordinary practice where no patented appliance is used.

United States Letters Patent No. 169,659, bearing date November 9, 1875, were issued to me for an excellent pipe-joint, which was available while pipes were formed in trenches in a horizontal position, as such pipes were required to be made with a groove in the periphery of the spigot end. The fashion of making pipes, however, changed. Consequently for some years past pipes have been made vertically in pits or wells, rendering the casting of a groove therein impracticable.

United States Letters Patent No. 347,060, bearing date August 10, 1886, were issued to me for an excellent improvement on the above, invented to be applied to pipes having a smooth exterior surface, as contradistinguished from pipes having the body grooved or recessed, and providing a straight-edged detachable collar to be used in perfecting the joint.

United States Letters Patent No. 376,609, bearing date January 17, 1888, were issued to me for a further excellent improvement providing tools for forming cold-packed pipe-joints. Therein I secured a tool or device with serrations upon its front edge to facilitate its operations in upsetting a lead band.

In the present instance I desire protection for my apparatus for constructing pipe-joints.

The principal parts of this invention of the apparatus are flexible, and consist of a continuous piece or pieces of steel, steam-coiled wood, or other flexible material, as contradistinguished from devices which are rigid, made in parts, and mechanically joined together. The reasons therefor are as follows: As cast-iron pipes which are found in the market are made there are of some sizes three and of other sizes four different thicknesses of metal in their construction in each respective size of bore, this causing variations in the outside diameters thereof. Consequently a rigid apparatus made to fit a particular outside diameter could not be adjusted to any other, though all of the same bore. This must be overcome or the apparatus must be duplicated for every bore of pipe as many times as there are different outside diameters, for there is where the apparatus must be applied. Economy forbids unnecessary duplication, and to avoid this I have constructed a flexible apparatus which may be readily adjusted to fit either thickness of metal of each respective bore.

As sections of metal pipes have been joined together time out of memory the spigot of one section has been inserted within the socket or bell of its companion. Then, after other necessary preparation, molten lead has been poured into and fills up the space inside the socket or bell around the spigot. While the lead is expanded with heat the joint is good. However, lead in the act of cooling shrinks from the inner walls of the socket or bell, and any fluid would leak out unless the lead were manipulated so as to cause it to adhere to the inside of the socket or bell. If this could be properly done by the old-time process, a perfect joint would result; but that it cannot be done is patent to every person when the street-trenches are opened for any purpose by the intolerable stench from escaping gas. The reason of the failure of the old-style joint is because the lead band forming such joint presents to view a perpendicular face across its thickness. Against this face the workman directs his labors with a calking-iron and hammer, and as lead's constituent elements are more firmly united to each other than is the band to the spigot this violence destroys the tenacity of the lead's clinging to the spigot, and there the leakage occurs. The lead band shown herein has a graduated impacting lip, which will afford sufficient lead for a perfect union between the periphery of the lead band and the inner walls of a socket or bell or of a sleeve without affecting the tenacity of the lead's clinging by shrinking to the spigot; hence with both fittings of the lead being perfect there can be no leakage.

I desire protection for the flexible apparatus for constructing pipe-joints, the apparatus being made of any flexible material, whereby I am enabled to quickly, satisfactorily, and economically cast the lead band with graduated impacting lip on the pipe and center the mold upon the pipe with a flexible collar having its front edge properly graduated, whereby to produce the graduated impacting lip on the lead band.

The objects of my invention are sufficiently set forth in the foregoing statements; and the invention consists of the features specifically defined in the claims at the end of this specification.

In the accompanying drawings, which form a part of this specification, and in which like features are indicated by like letters of reference in the several views, Figure 1 is a front elevation of the flexible mold whereby the lead band is cast upon the spigot end of the pipe. Fig. 2 is a longitudinal section of a section of pipe with the mold in position. The latter is also in longitudinal section, showing the lead band in black with its graduated impacting lip cast upon the end of the pipe. Fig. 3 is a longitudinal section of pipe provided with a soft-metal band, showing its graduated impacting lip cast thereon by my apparatus. Fig. 4 is a front view of the flexible collar used to center the flexible mold upon the pipe and form the graduations upon the lead band, and showing the open space or gate on its upper part through which the molten lead is poured into the mold-chamber. Fig. 5 is a longitudinal section of the flexible collar, showing its front edge properly graduated for forming the graduated impacting lip of the lead band. Fig. 6 is a longitudinal section of the flexible hood which fits over the end of the pipe, a front view of the same being exhibited in Fig. 1. Fig. 7 is an end view, and Fig. 8 is a side elevation, of a modification of the mold formed of sheet-iron or the like, and affording some flexibility by allowing the lapping of the casing to be free and not riveted tightly.

Referring to the drawings, $a$, Fig. 1, indicates the flexible head-block, which sets against the pipe end, being adjusted and held to its circular form by the swiveled rods $c\ c\ c'$ and securing-band $d$. I prefer to construct the head-block of steam-coiled wood, which is light in weight and very flexible, the ends thereof being brought together and caused to lap by the tightening of the band $d$, said ends being shaped as shown at $b$ in Fig. 2—that is, they are cut off slantwise at an angle of about forty-five degrees, so that they may lap by each other, whereby the circle can be distended and made larger and the ends still remain in contact, leaving no open space for the molten lead to escape, as would be the case were the ends cut squarely. The handles $e\ e$ are attached at opposite sides of the head-block, passing through slots in the band $d$; or a single handle may be used, as shown at $e$ in Fig. 7.

$f$ represents a circular strip of asbestus or other suitable material, which I secure to the rear side of the head-block at the point where the pipe end comes against it, the purpose of this being to insure close contact between the head-block and the pipe end and prevent the lead as it is poured into the mold-chamber from running to waste. In the drawings the asbestus is shown as extending inwardly a considerable distance; but this is unnecessary. By forming a slight projection on the rear side of the head-block to meet and contact with the pipe end this strip may be entirely dispensed with. The locking devices $g'\ h'$ are used to adjust the securing-bands $g\ h$, respectively, shown in succeeding figures.

$i$ represents the pipe-section, upon the spigot end of which the soft-metal band is cast.

$g$ is the securing-band passing around the outer circumference of the collar, Figs. 4 and 5, its ends being held together by the locking device $g'$. $h$ is a similar band passing around the casing $j$ of the hood, Fig. 6, which partly overlaps the collar, the band serving to bind it closely thereto.

$k$ is the bell end of the pipe.

The flexible collar G (shown in Figs. 4 and 5) may be made in one piece or of successive layers of flexible material, as wood, steel, &c., its inner edge, or that which forms one side of the mold-chamber, being made with the graduations $m\ n\ o\ p$ on its face for forming the graduated projecting lip on the soft-metal band $l$, as seen in Figs. 2 and 3.

$v$, Fig. 4, shows the open space intentionally left between the ends of the collar to afford a gate or passage-way through which the molten metal flows to the mold-chamber.

It will be observed by reference to Fig. 1 that I have provided three swivel-rods $c\ c\ c'$ within the head-block $a$, which are placed there to preserve its circuity as it is distended or contracted by the loosening or tightening of the band $d$ for the purpose of adjusting it to the different thicknesses of metal composing a given bore of pipe. The screw-bolt $b'$ and rod $c'$ assist each other in preserving the breadth of the circle, and either may be dispensed with without materially affecting the efficiency of the apparatus. The end of the screw-bolt $b'$ presses against the dead-shoulder $b^2$, passing through a threaded eye in the shoulder $b^3$.

In Fig. 2 the application of the apparatus to the pipe is clearly seen, the conformation of the soft-metal band being indicated in solid black and marked $l$. The collar is first placed upon the pipe, and by means of the band $g$ and locking device $g'$ tightly secured thereon. The hood, Fig. 6, is then passed upon the end of the pipe, the casing $j$ thereof extending over and resting upon the part *m* of the collar, to and around which it is held securely by the securing-band *h* with its locking device *h'*, the ends of the casing overlapping, as shown in Fig. 8 at *j'*. The hood is thus centered upon the pipe, its casing being kept equidistant from the surface thereof. A space is thereby created between the outer surface of the pipe and the inner surfaces of the casing, and it is this space (shown in Fig. 2 as occupied by the soft metal *l*) which acts as the mold-chamber, its other side being the head-block *a*, with the asbestus *f*, or similar material, and the graduated edge *m n o p* of the collar. In adjusting the collar the space or gate *v* is kept uppermost, of course, and the locking device *g'* is at the top of the pipe. It will be seen that the mold-chamber is entirely closed except at the point *v*, where the continuous circle of the collar is interrupted. Therefore at this point, which I term the "gate," entrance will be had to the chamber, and it is through this gate that the molten metal is poured from the melting-pot or ladle. The metal naturally flows around the sides of the pipe within the mold-chamber, forming first at the bottom thereof, and as more is poured in forms around the sides and at the top until every part of the chamber is filled around the entire circumference of the pipe within the chamber. In running the metal into the mold it may be found advantageous to form at the entrance to the gate *v* a semicircle wall of any suitable material—putty, clay, or the like—to prevent any of the metal from going to waste. The metal hardens at once, the securing-bands *d h g* are loosened, and the collar and hood removed, leaving the band cast upon the pipe, as shown in Fig. 3. In Figs. 7 and 8 I show a more simply-constructed hood, which, while it is somewhat flexible, has not the larger range of that described above. The head-block *a* being rigid, the only flexibility of this style of hood is found in the casing *j*, which, as in the previously-described hood, has overlapping ends *j'*, not secured in any manner except by being attached to the head-block by suitable means, and when in position on the pipe to the collar by the band *h*. Instead of handles at either side, I use only one handle *e* in the manner shown, though the former could be employed. This hood is used in connection with the collar above described, and performs the same functions that the hood shown previously does, except that it has not the same degree of flexibility, and is therefore not adjustable to so many thicknesses of metal.

What I claim, and desire to secure by Letters Patent, is—

1. The flexible apparatus for casting a soft-metal band upon the spigot end of a pipe before the same is inserted within a socket or sleeve, consisting of the flexible head-block severed at the top at an angle of about forty-five degrees to aid its flexibility, and swivel-rods or screw-bolts for distending or contracting the flexible head-block, whereby it may be adjusted to the different thicknesses of metal in pipes of any given bore, the flexible casing *j*, with the lapping ends *j'*, the securing-band *h*, and the flexible collar severed at the top to aid its flexibility, whose encircled or overlapped edge is graduated, arranged to surround said pipe, and being encircled or overlapped about half its width by said flexible casing of said flexible hood to center said flexible hood with relation to the pipe, whereby a space or chamber for receiving and retaining molten soft metal is formed between the periphery of the pipe, the inner surface or walls of said flexible casing and flexible head-block, and the encircled or overlapped graduated edge of said flexible collar, for the purpose specified, and as described.

2. In a flexible apparatus for casting a soft-metal band upon the spigot end of a pipe before the same is inserted within a socket or bell or sleeve, the herein-described flexible hood of sheet-iron or the like, the flexible casing *j*, with the lapping end *j'*, the securing-band *h*, arranged to fit over the end of the pipe and extend part way along the periphery of said pipe, and a flexible collar severed at the top to aid its flexibility, arranged to surround said pipe, and being encircled or overlapped about half its width by said flexible casing of said flexible hood to center said flexible hood with relation to said pipe, whereby a space or chamber for receiving and holding molten soft metal is formed between the periphery of the pipe, the inner surfaces or walls of said flexible hood of sheet-iron or the like, and the encircled or overlapped edge of said flexible collar, substantially as described, and for the purpose specified.

Witness my hand this 18th day of December, 1888.

ANDREW NERVA RANKIN.

Witnesses:
 JNO. E. SIMPSON,
 CLARENCE F. PILLET.